United States Patent
Jöhnke et al.

(10) Patent No.: US 6,552,443 B1
(45) Date of Patent: Apr. 22, 2003

(54) POWER RING

(75) Inventors: Volker Jöhnke, Gettorf (DE); Christoph Hernekamp, Strande (DE)

(73) Assignee: Rheinmetall Landsysteme GmbH, Kiel (DE)

(*) Notice: Subject to any disclaimer, the term of this patent is extended or adjusted under 35 U.S.C. 154(b) by 0 days.

(21) Appl. No.: 09/548,335

(22) Filed: Apr. 12, 2000

(30) Foreign Application Priority Data

Apr. 12, 1999 (DE) .......................... 199 16 452

(51) Int. Cl.$^7$ .................................................. B60L 1/00
(52) U.S. Cl. ..................................... 307/10.1; 307/10.7
(58) Field of Search .............................. 307/10.1, 10.7, 307/11, 31, 36

(56) References Cited

U.S. PATENT DOCUMENTS

| | | | |
|---|---|---|---|
| 5,675,178 A | 10/1997 | Anma et al. | 257/666 |
| 6,127,741 A | * 10/2000 | Matsuda et al. | 307/30 |

FOREIGN PATENT DOCUMENTS

| | | |
|---|---|---|
| DE | 3702517 A1 | 8/1988 |
| DE | 19811626 A1 | 9/1998 |
| DE | 198 11 626 A1 | 9/1998 |
| DE | 19733760 A1 | 3/1999 |
| EP | 0 895 899 A2 | 2/1999 |

* cited by examiner

*Primary Examiner*—Shawn Riley
*Assistant Examiner*—Lawrence Luk
(74) *Attorney, Agent, or Firm*—Venable; Norman N. Kunitz

(57) ABSTRACT

A power ring of annular conductor configuration for use in a military vehicle to supply electricity to devices in the vehicle. The power ring includes a plurality of controllers (1) as monitoring and switching devices arranged along and connected with the annular conductor segments forming the ring, a plurality of taps provided for the annular conductor (9) for connecting the annular conductor to loads, feed locations on the annular conductor (9) for feeding electrical energy, and data connections between the controllers (1) and a superordinated control apparatus for monitoring and controlling the power ring. The tap or the feed location for the annular conductor is in each instance structurally combined as a unit with a controllable node that is disposed along the annular conductor and connected into the annular conductor in a multiple manner so that annular conductor segments (9.1, 9.2, 9.3, 9.4, 9.5) are obtained between the tap controllers (1.2, 1.3, 1.4, 1.5) and at least one load (11) or a current feed (10) at one tap controller (1.2, 1.3, 1.4, 1.5) is connectable with the annular conductor, and the tap controller includes a plurality of controlled switches (3,4) with which the annular conductor segments may be, at the left and/or at the right, connected to or disconnected from the tap controller and, with which the load (11) or the feed may be connected to or disconnected from the tap controller.

5 Claims, 3 Drawing Sheets

POWER RING

CROSS REFERENCE TO RELATED APPLICATION

This application claims the priority of German patent Application No. 199 16 452.5 filed Apr. 12, 1999, which is incorporated herein by reference.

BACKGROUND OF THE INVENTION

This invention relates to a power ring that has an annular conductor structure and is installed in a vehicle, particularly a military vehicle, for supplying devices in the vehicle with electric energy. The power ring includes a plurality of controllers functioning as monitoring and switching devices that are connected along and on an annular conduit, as well as a plurality of taps on the annular conduit for connecting the respective devices with the annular conduit. The power ring includes feed locations along the annular conduit for supplying electric energy and data connections between the controls, and a superordinated control device for monitoring and controlling the power ring.

Reliably supplying electric energy to devices which are individual components that consume electric power in a vehicle, particularly in a military track laying or wheeled vehicle, is effected increasingly by means of a "power ring" in which, in contrast to a star-like connection of each load (electric energy consumer) to a generator, an annular conduit that conveys the energy connects each electric load with the current producer or the generator.

A short circuit on the annular conduit of the power ring results in an interruption of energy supply of all the loads connected to the power ring. Then, conventionally, a repair workshop is visited to eliminate the defect. In particular for applications in military vehicles, however, an interruption of the internal current supply to all devices connected to the power ring because of a simple short circuit is undesirable and not permissible.

Conventional solutions provide to subdivide the power ring into individual segments by means of a power ring controller. The devices are connected to the segments of the power ring by taps on the power ring. In case of a short circuit in one segment, only those devices that are connected to the respective segment are affected by the short circuit and become inoperative. The devices connected to the other segments of the power ring continue to be supplied with electric energy and thus continue to remain functional.

German patent document 197 33 760 discloses, in connection with a data bus for information transmission, that transmitter and receiver components connected to the bus conduit at nodes may switch on a terminal resistance at each node, and further switches may be placed at the node so that a device connected to the node may be disconnected from the bus conductor in case of a defect, while the remaining bus operation is not affected by the failure of one node.

The conventional solutions have the disadvantage that by dividing the power ring into ring segments, in case of a failure the defective power ring segment is switched off by means of the power ring controller, as a result of which the devices connected to such a segment are no longer supplied with electric energy. In case of a small number of segments as well as controllers and the same number of devices, such a disadvantage is even greater because a relatively large number of devices fail with a single segment because a greater number of devices per segment is supplied with electric energy.

A redundancy construction of the power ring may be remedied for a device breakdown in case of individual failures. Such a construction, however, requires substantial outlay and is disturbance prone because an additional failure sensing has to be provided and the number of the power ring components are doubled.

SUMMARY OF THE INVENTION

It is an object of the invention to limit the effect of a short circuit in a power ring in such a manner that only a few connected devices fail, that is, a possibly large number devices are not affected by a simple short circuit. A simple possibility should be found to continue to supply all devices with electric energy despite a breakdown of a power ring segment also viewed as a connecting conductor, at least for failure number one (single failure case).

The above object generally is achieved according to the present invention by a power ring of annular conductor configuration for use in a vehicle, preferably a military vehicle, to supply electricity to devices in the vehicle, with the power ring including: a plurality of controllers as monitoring and switching devices arranged along and connected with a plurality of conductor segments connected to form an annular conductor; a plurality of taps provided for connecting the annular conductor to loads; at least one feed location connected to the annular conductor for feeding electrical energy to the annular conductor and to the loads; and data connections from the controllers to a superordinated control apparatus for monitoring and controlling the power ring; and wherein: each tap and feed location for the annular conductor is structurally combined as a unit with a controlled node of a respective controller; each tap controller is connected along the annular conductor and into the annular conductor in a multiple manner so that the annular conductor segments are disposed between adjacent tap controllers, and at least one load or a current feed connected to a tap controller is selectively connectable with adjacent conductor segments of the annular conductor via a plurality of controlled switches disposed at the tap controller of the respective controller with which the respective annular conductor segments may selectively be connected to or disconnected, and with which the respective load or the feed may selectively be connected or disconnected.

According to the invention, the power ring is provided with its structural elements in such a manner that the power ring controller and the power ring tap are combined into a common system unit and device. The thus-formed tap controllers are interconnected with conductors as a power ring in such a manner that the devices to be supplied with electric energy need only to be connected to the tap controller. In case of a failure, one segment of the power ring which is situated between two tap controllers, is switched off, and all devices which are connected to the tap controllers may be continued to be supplied. In case the failure concerns only the power ring conductor, all devices continue to be supplied because these are only connected to the tap controllers and the annular conductor continues to be closed via the remainder of the ring. Only in case of a failure of a tap controller is that portion of the devices which is coupled to the controller no longer supplied. Such a condition would appear also in case of two conductor segment failures. In case of a single conductor segment failure or isolated individual failure, however, all devices continue to be supplied by the power ring according to the invention.

DESCRIPTION OF THE PREFERRED EMBODIMENT

Figure 1:
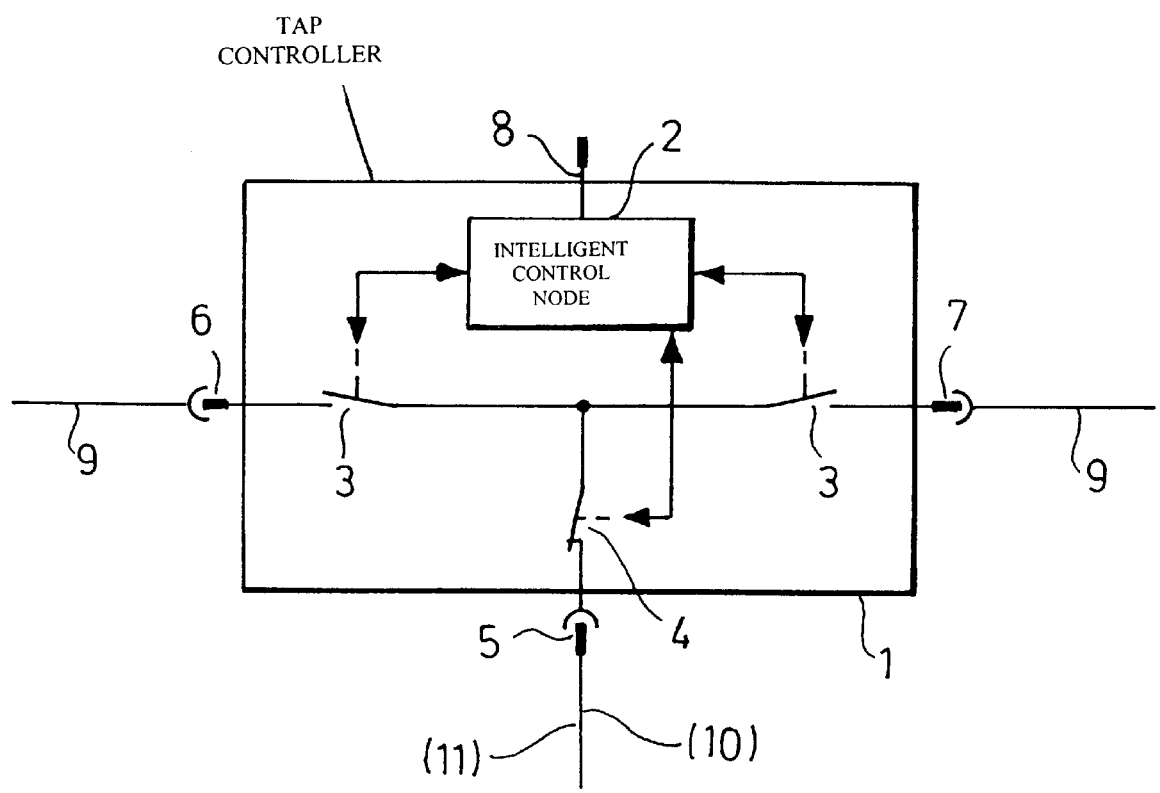
FIG. 1 is a basic schematic diagram of a tap controller according to the invention.

Turning to FIG. 1, the tap controller 1 illustrated therein is composed of an intelligent control node 2, two controllable power dividers 3, shown schematically as switches, and a controllable conductor protector 4, for example a circuit breaker, likewise schematically shown as a switch. As shown, the devices 3 and 4 are controlled by the intelligent node 2, which provides excess current detecting sensing for the devices 3, and condition, i.e., status, reporting for the device 4. A device 11 to be supplied with electric energy or a feed 10 for the power ring is, in the alternative and dependent on the purpose of use, connected with the tap controller 1 via a terminal 5. The terminal 5 is, in turn, connected via the device or circuit breaker 4 to the through-line or conductor 12 of the controller 1, which through-line is connected between the two power dividers or controllable switches 3 of the respective tap controller 1. The power ring thus is an annular conductor 9 formed of conductor segments coupled to the respective tap controller by plugs 6 and 7, and completed by the respective through-lines 12 when the devices 3 are closed. The data terminal 8 connects the tap controller 1 with a superordinated control computer (not further shown) for the required data exchange.

Figure 2:
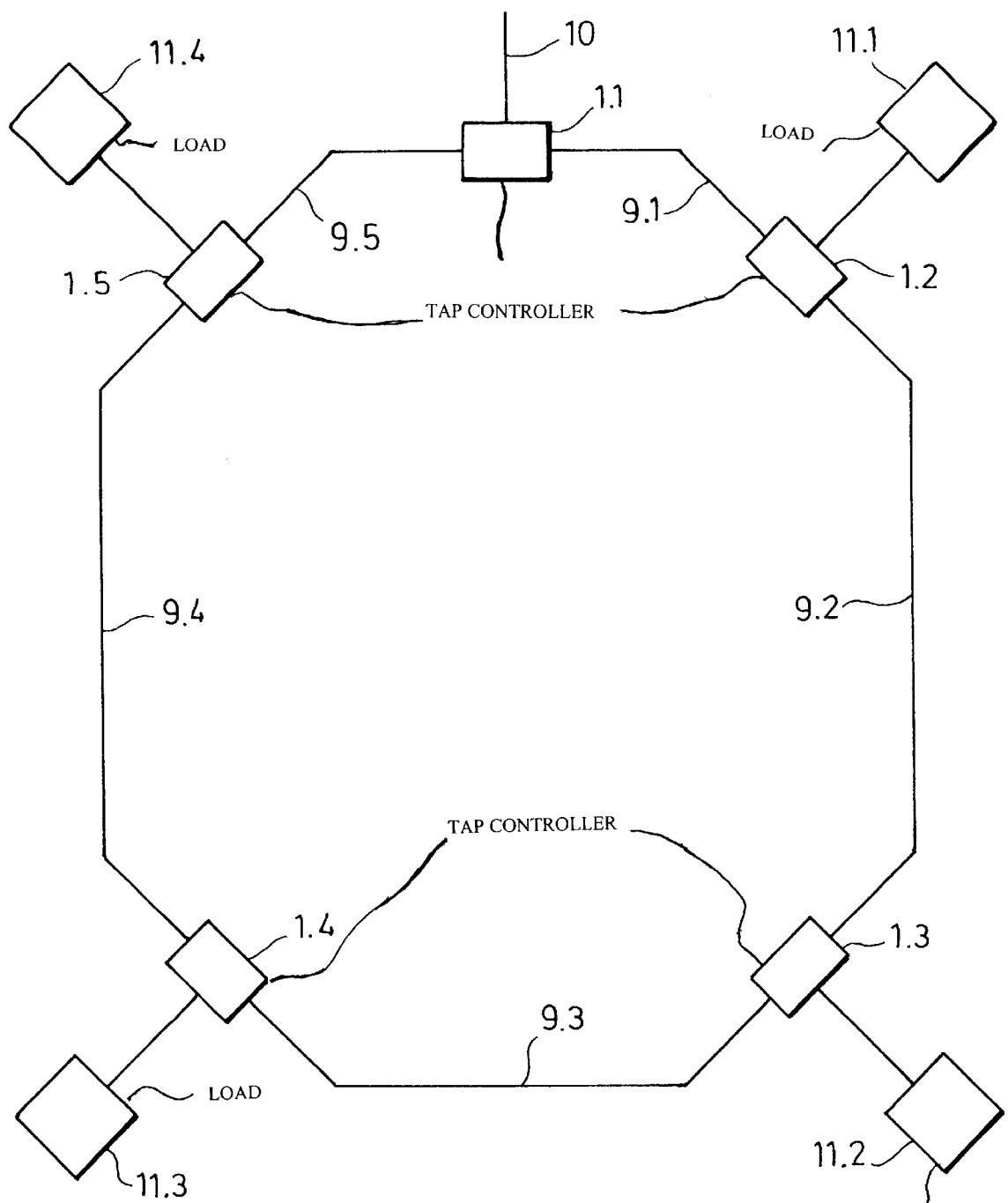
FIG. 2 shows a power ring provided with tap controllers according to the invention.

In FIG. 2 the power ring 9 is, as an example of the operational principle, formed of ring segments 9.1, 9.2, 9.3, 9.4 and 9.5. Tap controllers 1.1, 1.2, 1.3, 1.4 and 1.5 are distributed along and connected to the ring. The power ring is supplied with energy via the conductor 10 and the controllers 1. For this purpose, the devices or switches 3 are in their normally closed shown positions under control of the intelligent node 2 of the tap controller 1. Electric devices 11.1, 11.2, 11.3 and 11.4 are connected to the respective tap controllers 1.2, 1.3, 1.4 and 1.5 as energy consumers or loads that are supplied with electric energy by the power ring.

Figure 3:
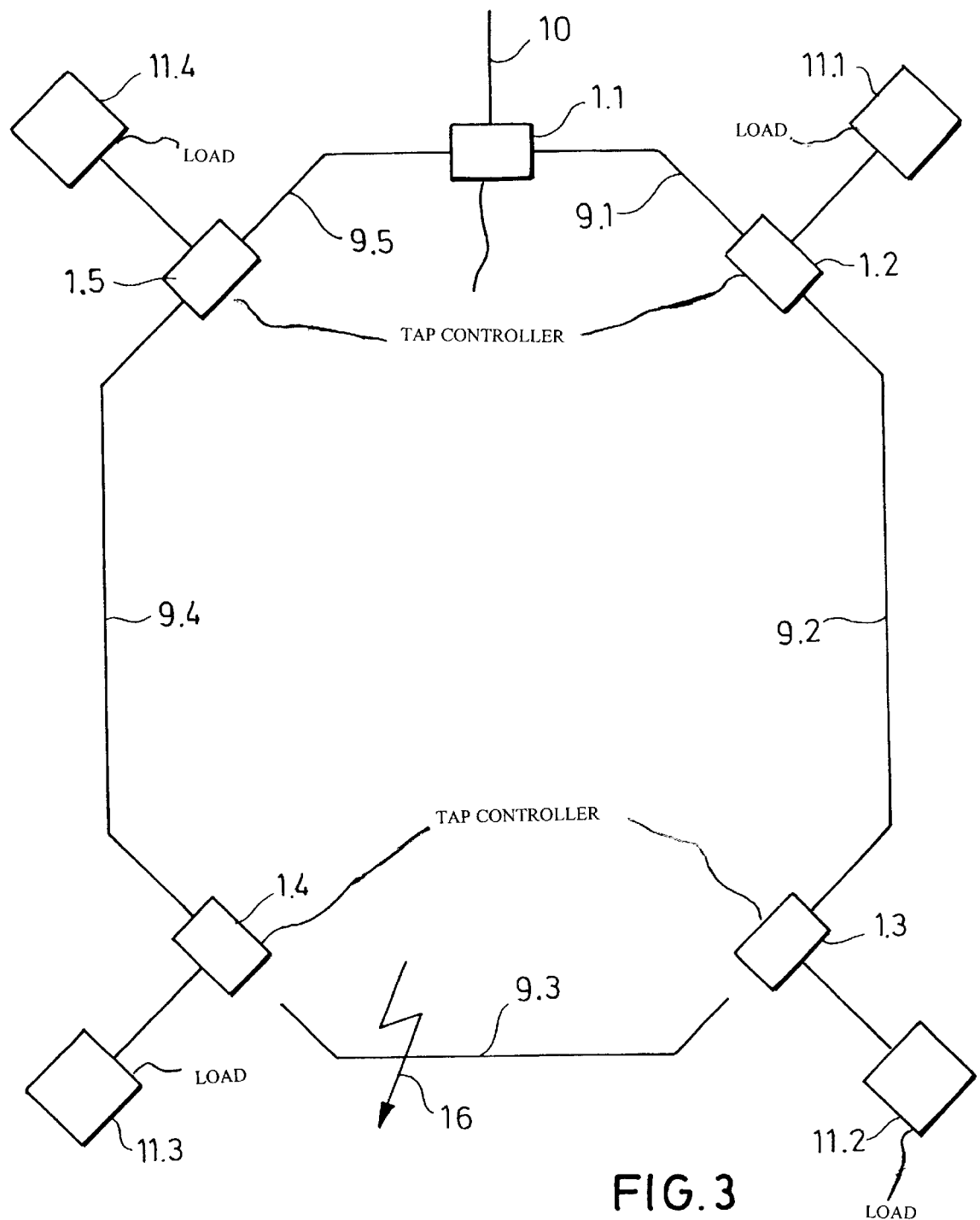
FIG. 3 shows a power ring similar to FIG. 2, illustrated in case of a short circuit in one ring conductor segment.

In FIG. 3 the power ring illustrated in FIG. 2 is shown in case of a short circuit 16 as a symbol between the tap controllers 1.3 and 1.4 and the ring segment 9.3. In case of such a failure, the failure of the power ring segment 9.3 is detected, e.g., via the excess current sensors for the devices 3, and switched off by the tap controllers 1.3 and 1.4 so that no connection is maintained with the remainder of the power ring. That is, the device or switch 3 connected to the ring or conductor segment 9.3 in each of the tap controllers 1.3 and 1.4 is opened. In case of such a failure, all other devices 11.1–11.4 continue to be supplied with current via the remainder of the power ring 9.

If such a failure appears at any other ring segment, e.g., 9.4, all devices would continue to be supplied with current in a similar manner. Only when a second failure occurs would all devices no longer be supplied with current, i.e., less than all would be supplied depending on the location of the failure. In a further embodiment several energy feed locations 10, 11 may be provided in addition to the one which is shown.

Via respective data terminals 8 (not shown in FIGS. 2 and 3) the tap controllers 1 are connected with a superordinated control computer which monitors the power ring.

We claim:

1. A power ring of annular conductor configuration for use in a vehicle to supply electricity to devices in the vehicle, said power ring including: a plurality of controllers as monitoring and switching devices arranged along and connected with a plurality of conductor segments connected to form an annular conductor; a plurality of tap controllers provided for connecting the annular conductor to loads; at least one feed location connected to the annular conductor for feeding electrical energy to the annular conductor and to the loads; and data connections from the controllers to a superordinated control apparatus for monitoring and controlling the power ring; and wherein: each tap and feed location for the annular conductor is structurally combined as a unit with a controlled node of a respective controller; each tap controller is connected along the annular conductor and into the annular conductor in a multiple manner so that the annular conductor segments are disposed between adjacent tap controllers, and at least one load or a current feed connected to a tap controller is selectively connectable with adjacent conductor segments of the annular conductor via a plurality of controlled switches disposed at the tap controller of the respective controller with which the respective annular conductor segments may selectively be connected or disconnected, and with which the respective load or the feed may selectively be connected or disconnected.

2. An apparatus according to claim 1 wherein the tap controller is an intelligent control unit terminal for a load and a current feed.

3. An apparatus as defined in claim 2 wherein the tap controller has devices for excess current sensing and for a conductor protection with status indication.

4. An apparatus according to claim 1 wherein the tap controller has, for data exchange, a data connection for a superordinated control device.

5. An apparatus according to claim 1 wherein each tap controller includes a through-line having respective ends connected via respective ones of said controllable switches to ends of respective ones of said adjacent annular conductor segments, and a further one of said controllable switches connecting the through-line to a load or feed.

* * * * *